(12) United States Patent
Huggins

(10) Patent No.: US 8,692,519 B2
(45) Date of Patent: Apr. 8, 2014

(54) BATTERY MANAGEMENT

(75) Inventor: Mark Wayne Huggins, West Lothian (GB)

(73) Assignee: TWS Total Produtos (Commercial Offshore de Macau) Limitada (MO)

( * ) Notice: Subject to any disclaimer, the term of this patent is extended or adjusted under 35 U.S.C. 154(b) by 612 days.

(21) Appl. No.: 13/001,085

(22) PCT Filed: Jun. 19, 2009

(86) PCT No.: PCT/GB2009/001554
§ 371 (c)(1),
(2), (4) Date: Apr. 28, 2011

(87) PCT Pub. No.: WO2010/001090
PCT Pub. Date: Jan. 7, 2010

(65) Prior Publication Data
US 2011/0193528 A1 Aug. 11, 2011

(30) Foreign Application Priority Data

Jul. 3, 2008 (GB) .................................. 0812198.0

(51) Int. Cl.
*H02J 7/00* (2006.01)
(52) U.S. Cl.
USPC ............................ 320/134; 320/140; 320/155

(58) Field of Classification Search
USPC .................. 320/134, 137, 140, 155; 324/426; 340/636.1, 636.21
See application file for complete search history.

(56) References Cited

U.S. PATENT DOCUMENTS

| | | | | |
|---|---|---|---|---|
| 6,043,628 | A * | 3/2000 | Perelle et al. .................. | 320/119 |
| 6,169,387 | B1 * | 1/2001 | Kaib .............................. | 320/132 |
| 6,956,488 | B2 * | 10/2005 | Hasegawa ................ | 340/636.15 |
| 6,983,212 | B2 * | 1/2006 | Burns ............................. | 702/63 |
| 7,400,113 | B2 * | 7/2008 | Osborne ....................... | 320/118 |
| 2003/0117112 | A1 * | 6/2003 | Chen et al. .................... | 320/137 |
| 2007/0182366 | A1 * | 8/2007 | Lee .............................. | 320/107 |
| 2007/0216355 | A1 * | 9/2007 | Kim .............................. | 320/128 |

* cited by examiner

*Primary Examiner* — Yalkew Fantu
(74) *Attorney, Agent, or Firm* — RatnerPrestia

(57) ABSTRACT

Apparatus and method for battery calibration and state of charge determination (SoC) within battery packs by detecting charge levels in a cell or cells, sending the charge level information to a controller which controls the movement of charge in the battery wherein, the controller initiates the discharge of a sub-unit to a predetermined level into the other sub-units and the charging of said sub-unit in the battery to a predetermined level from the charge held on the other sub-units to improve the accuracy and reliability of battery calibration and provide an accurate State of Charge indication from battery first use to end of life.

37 Claims, 3 Drawing Sheets

BATTERY MANAGEMENT

This application is a U.S. National Phase Application of PCT International Application No. PCT/GB2009/001554, filed Jun. 19, 2009.

FIELD OF THE INVENTION

The present invention relates generally to battery management systems and more particularly to battery calibration and state of charge determination (SoC) within battery packs.

BACKGROUND TO THE INVENTION

Battery management systems are used to safely optimise the efficient use and charging of batteries comprising one or more cells.

Typically, battery management systems comprise components which:
measure the state of charge i.e. the amount of stored energy remaining in the battery;
measure the state of health measurement i.e. the life expectancy of the battery;
ensure safe battery operation;
control the charging of the battery by regulating the charging current and voltage; and
provide cell balancing to ensure that the maximum energy is stored and delivered without activating protection circuitry.

Presently many different electronic circuits are employed to implement the functions described above. In general, cost constraints mean that not every battery management system employs all the above functions. Semiconductor manufacturers have developed specific electronic integrated circuits that provide one or more of them in an attempt to reduce cost and minimise solution size. Examples of devices of this type are Fuel Gauging IC's that provide state of charge (SoC), Protection IC's that monitor the safe operation of the battery, Passive Cell Balancer IC's that ensure safe charging of multiple series connected battery cells, and Charger IC's that control the battery's charger unit. It therefore takes a number of integrated circuits and additional discrete circuitry to build a complete battery management system.

A key feature of any battery management system is the ability to provide an accurate indication of its state of charge either as a percentage of absolute or relative capacity or expressed in Amp Hours (Ahr) or as a time to empty figure. State of the art secondary cell chemistries are commonly based on Lithium as it has the highest commercially available energy density. Lithium secondary cells have a near 100% coulometric efficiency which offers the potential for the accurate determination of state of charge through the integration of cell current. However, there are a number of mechanisms and environmental factors that can introduce measurement error into the coulometric SoC determination process.

In use, the battery pack SoC system will drift due to measurement error accumulated over time, for example, due to effects such as self leakage and temperature sensitivity of measurement system.

Typically, at time of manufacture, each battery is given its specified State of Charge status, which is 100% by default. This information is permanently recorded as an 'absolute' value into the pack and does not change. With each charge, the battery resets to the full-charge status. During discharge, the energy units (coulombs) are counted and compared against the 100% setting 'absolute' value. A perfect battery would indicate 100% on a calibrated fuel gauge. As the battery ages and the charge acceptance drops, the SoC decreases. The discrepancy between the factory-set 100% and the delivered coulombs on a fully discharged battery indicates the SoH.

A fuel gauge combines SoC and SoH information to allow a user to determine the amount of useable charge that is available in the battery.

There are a number of problems associated with providing accurate fuel gauges. Typically cell capacity will reduce with time and number of charge discharge cycles therefore cell age must be compensated for when determining the State of Charge.

The effective cell capacity is related to cell temperature with a strong fall off at cell temperatures below 0° C. and temperature must be compensated for when determining the State of Charge.

There are a number of low level current drains on each cell that the coulometric system is unable to measure. Such currents include the cell internal self leakage current and the quiescent current of the battery management system. Also, the electronic measurement circuits drift with time and temperature. These must also be compensated for when measuring State of Charge.

As mentioned above, typical fuel gauges work from an initial State of Charge calibration done at the time of manufacture. This process is time consuming and costly. In general, battery pack manufacturing costs would decrease if this step could be omitted from the manufacturing process.

While prior art systems attempt to deal with cell ageing and temperature problems, little attention has been paid to the mitigation of fuel gauging measurement system drift and the reduction in battery pack manufacturing cost and time.

Present SoC systems compensate for cell ageing through impedance tracking techniques that link cell age to its impedance. Temperature is also compensated through algorithms based on measured battery pack temperature.

SUMMARY OF THE INVENTION

It is an object of the invention to improve the accuracy and reliability of battery calibration.

It is another object of the invention to provide an accurate State of Charge indication from battery first use to end of life.

In accordance with a first aspect of the invention there is provided a battery management system for measuring the state of charge in a battery having more than one sub-unit, the system comprising:
a charge level detector for detecting charge levels in the sub-units;
a charge distributor adapted to move charge between the sub-units;
a controller adapted to receive charge level information and control the movement of charge in the battery;
wherein, the controller initiates the discharge of a sub-unit to a predetermined level into the other sub-units and initiates the charging of said sub-unit in the battery to a predetermined level from the charge held on the other sub-units.

Accordingly, the system of the present invention can in at least one aspect provide automated self calibration of sub-unit capacities within the battery pack.

Preferably, the predetermined discharge level is a complete discharge of the sub-unit.

Preferably, the predetermined charge level is a full charge of the sub-unit.

Preferably, the charge level detector is a data acquisition circuit.

Preferably, each of the sub-units has a dedicated charge level detector.

Preferably, said dedicated charge level detector is located on the sub-unit.

Preferably, the charge level detector is adapted to report the capacity of a sub-unit to the controller.

Preferably, the controller is a battery management system Micro Controller Unit.

Preferably, the discharge of a sub-unit to a predetermined level into the other sub-units and the charging of said sub-unit in the battery to a predetermined level from the charge held on the other sub-units occur in sequence.

Alternatively, the discharge and charge can occur simultaneously for different sub-units in a battery.

A complete discharge of one sub-unit into the remaining sub-units may be followed by a complete charge cycle. At the end of the charge cycle the capacity of fully cycled cells is known and the process is then repeated for the remaining sun-units. This process can occur while the battery pack is disconnected from a load, on external charge or indeed in a more limited sense on load.

Preferably, the controller comprises program instructions which control the operation of the controller.

Preferably, the program instructions are adapted to optimise available initial capacity for sub-units.

Preferably, the program instructions determine if initial capacity conditions are suitable to allow battery calibration.

Preferably, the controller is provided with an estimated value of the initial state of charge of the battery pack and sub-units based upon individual sub-unit voltages.

Preferably, the controller determines the sub-unit group split for calibration process based on available initial estimated capacity.

Preferably, the sub-unit is one or more cell.

Preferably, the system further comprises a capacity register which is nulled at end of sub-unit discharge detection.

Preferably, each cell has a capacity register.

The register value at the end of a full charge cycle from its initial nulled capacity state provides the absolute cell capacity measurement.

In accordance with a second aspect of the invention there is provided a method for measuring the state of charge in a battery having more than one sub-unit, the method comprising the steps of:

detecting charge levels in the sub-units; and sending the charge level information to a controller which controls the movement of charge in the battery;

wherein, the controller initiates the discharge of a sub-unit to a predetermined level into the other sub-units and the charging of said sub-unit in the battery to a predetermined level from the charge held on the other sub-units.

Preferably, the predetermined discharge level is a complete discharge of the sub-unit.

Preferably, the predetermined charge level is a full charge of the sub-unit.

Preferably, the charge level is detected by a data acquisition circuit.

Preferably, each of the sub-units has a dedicated charge level detector.

Preferably, said dedicated charge level detector is located on the sub-unit.

Preferably, the step of detecting the charge level comprises reporting the capacity of a sub-unit to the controller.

Preferably, the controller is a battery management system Micro Controller Unit.

Preferably, the discharge of a sub-unit to a predetermined level into the other sub-units and the charging of said sub-unit in the battery to a predetermined level from the charge held on the other sub-units occur in sequence.

Alternatively, the discharge and charge can occur simultaneously for different sub-units in a battery.

Preferably, the controller comprises program instructions which control the operation of the controller.

Preferably, the program instructions are adapted to optimise available initial capacity for sub-units.

Preferably, the program instructions determine if initial capacity conditions are suitable to allow battery calibration.

Preferably, the controller is provided with an estimated value of the initial state of charge of the battery pack and sub-units based upon individual sub-unit voltages.

Preferably, the controller determines the sub-unit group split for calibration process based on available initial estimated capacity.

Preferably, the sub-unit is a cell.

Optionally, the sub-unit is a group of cells.

Preferably, the system further comprises a capacity register which is nulled at end of sub-unit discharge detection.

Preferably, each cell has a capacity register.

The register value at the end of a full charge cycle from its initial nulled capacity state provides the absolute cell capacity measurement.

BRIEF DESCRIPTION OF THE DRAWINGS

The present invention will now be described by way of example only with reference to the accompanying drawings in which.

DETAILED DESCRIPTION OF THE DRAWINGS

Figure 1:
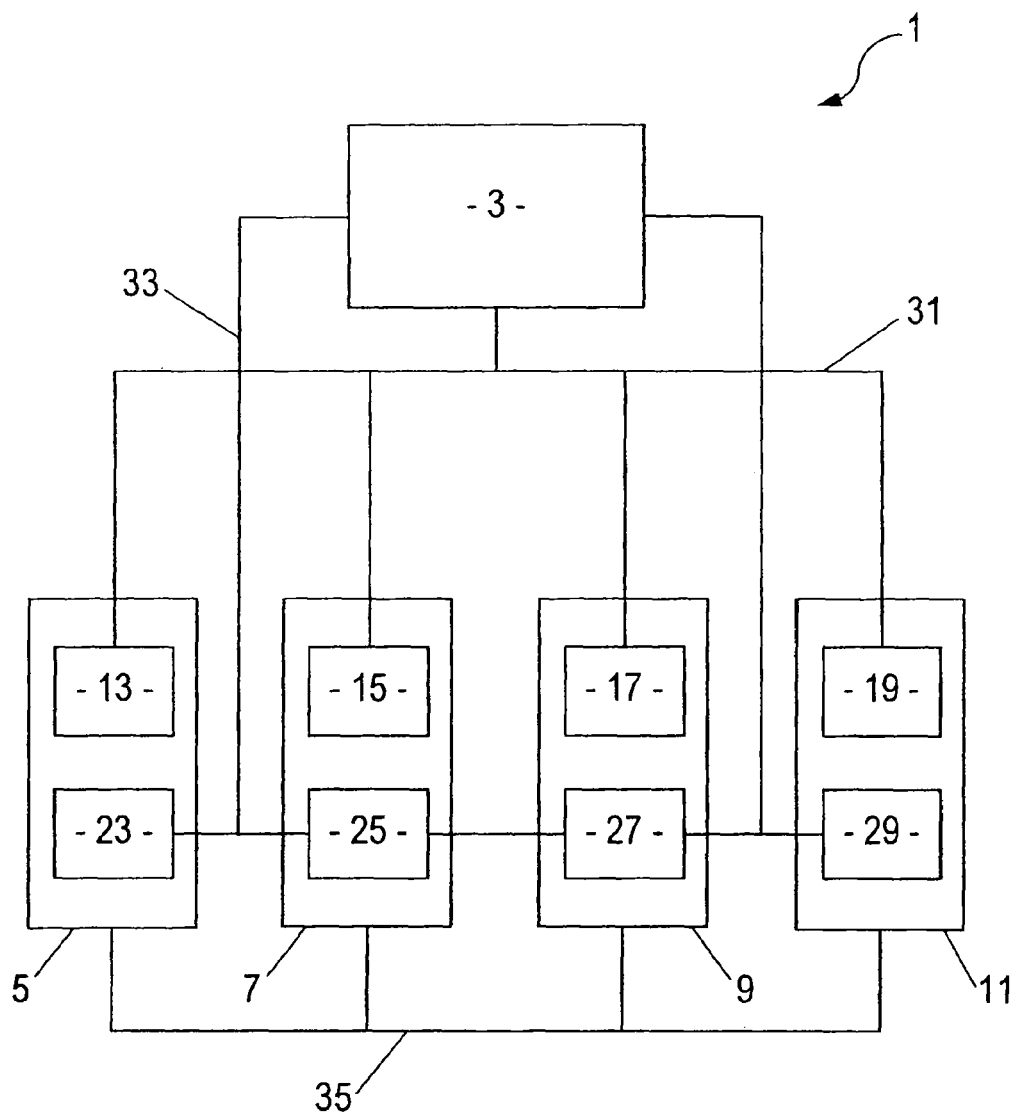
FIG. 1 is a block diagram of an embodiment of a system in accordance with the present invention.

The system 1 of FIG. 1 comprises a microcontroller unit 3 connected to data acquisition circuits 13, 15, 17 and 19 and to charge distributors or active cell balancers 23, 25, 27 and 29 of cells 5, 7, 9 and 11. The cells are connected 35 to provide a means for distributing charge between them.

Data acquisition circuits 13, 15, 17 and 19 are located on each sub-unit (which in this example each comprise a single cell) and enable the reporting of each cell's individual capacity back to the micro controller unit, MCU 3. In this example of the present invention the multi cell battery pack incorporates Active Cell Balancing 23, 25, 27 and 29 to enable the transfer of energy between cells within the battery pack. Under instruction from the battery management MCU 3, the active cell balancing system 23, 25, 27 and 29 transfer energy from one group of cells into another group within the battery pack.

A complete discharge of one group of cells into the remaining cells is first accomplished followed by a complete charge cycle. At the end of the charge cycle the capacity of fully cycled cells is known and the process is then repeated for the remaining group of cells. This process can occur while the battery pack is disconnected from a load, on external charge or indeed in a more limited sense on load.

The initial state of charge of the battery pack and cells is derived from individual cell voltages as an estimated value, this figure is cell chemistry specific derived from look up tables. The battery management MCU determines the cell group split for calibration based on available initial estimated capacity. Due to the small loss of energy during cell charge transfer there exists a minimum level of charge to complete a full calibration. There is also a maximum level of initial charge that would permit the discharge of cells. The minimum and maximum values vary depending upon the number of cells or sub-units in the battery.

Figure 2:
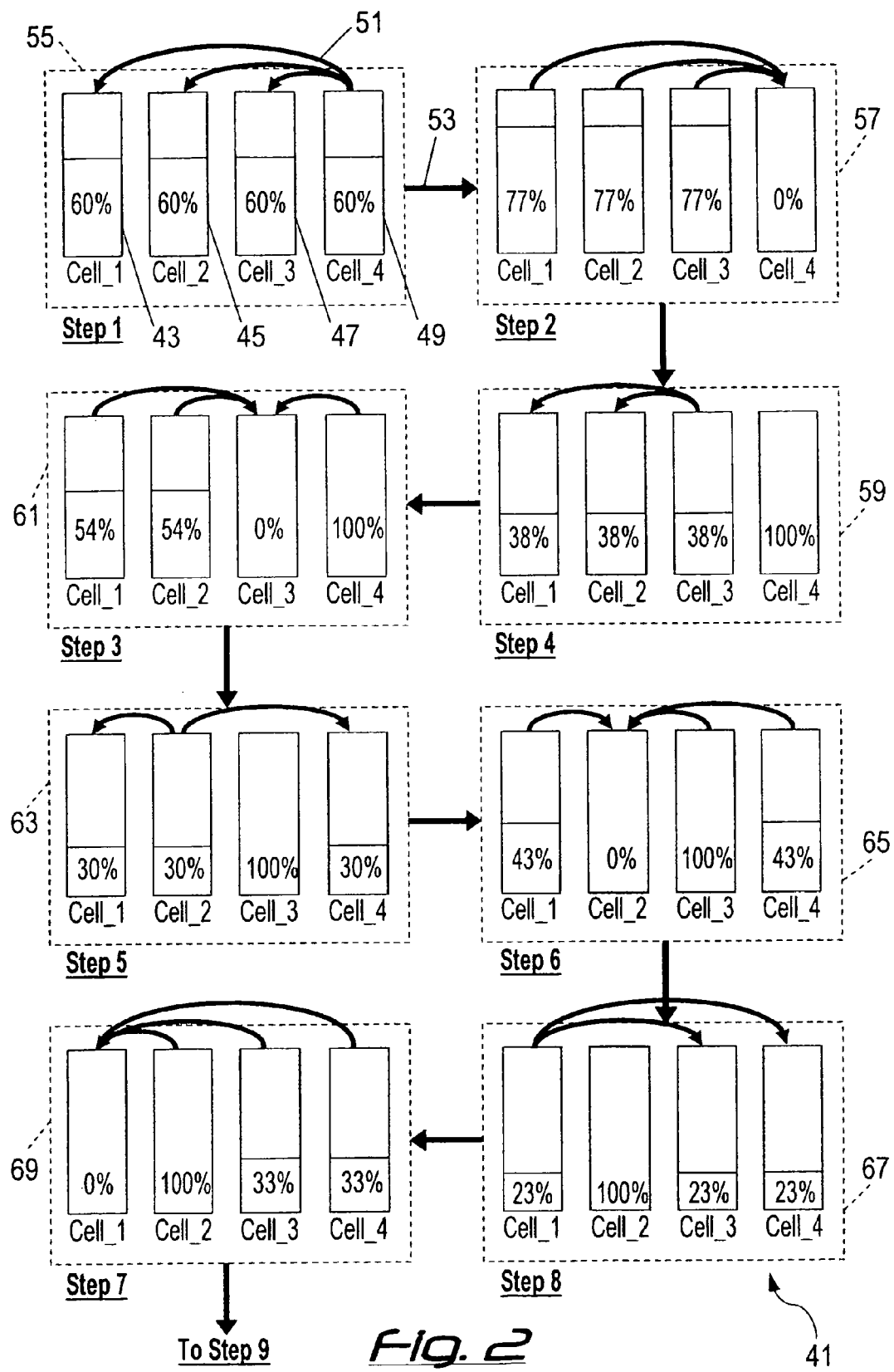
FIG. 2 shows an embodiment of the method of the present invention.
Figure 2:
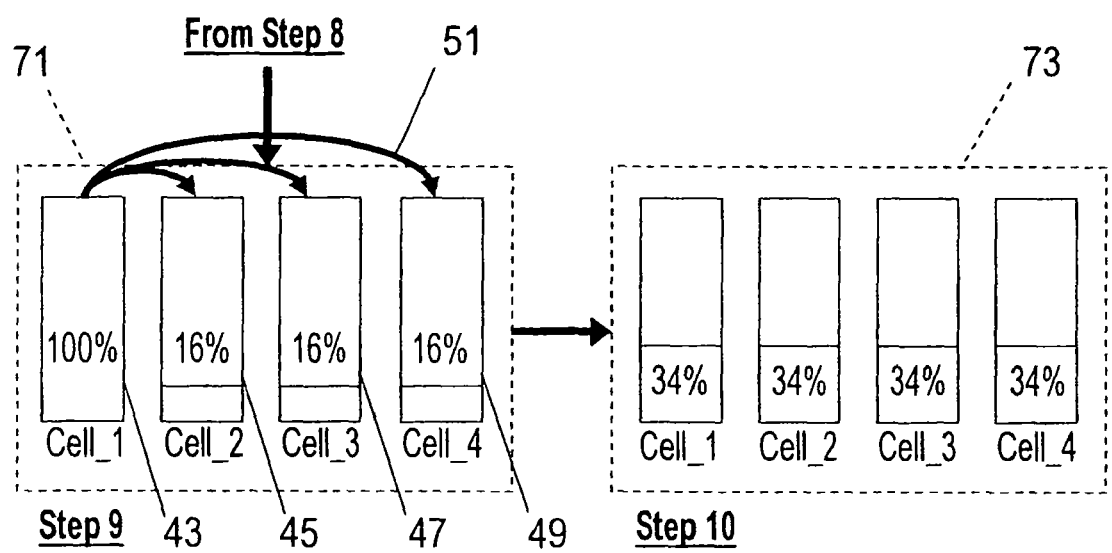

FIG. 2 shows the method by which the state of charge is measured to ensure accurate calibration of a battery. In each figure, the battery pack 41 comprises cells 43, 45, 47 and 49. The direction of flow of charge and the cell where the flowing charge originated is shown by arrows 51. Arrows 53, point to the next steps in the sequence.

In step 1, the initial state of cells within battery pack at manufacture is determined. Cells are usually shipped from cell manufacturer at a cell voltage of around 3.7V which correlates approximately to 60% cell capacity. In addition, cell_4 49 has been selected by the microcontroller for completer discharge. The data acquisition circuit of cell_4 49 monitors the charge level in that cell and provides data to the microcontroller which controls the activity of the cell balancer(s) in distributing charge between the cells.

In Step 2 57, cell_4 49 has been fully discharged into cells 1, 2 and 3 (43, 47 and 47). Thereafter, the cell balancers commence distributing charge from cells 1, 2 and 3 (43, 45 and 47) to cell_4 49.

In Step 3 59, cell_4 49 has been fully charged from cells 1, 2 and 3 and cell_3 47 is selected for complete discharge by moving charge to cell_1 43 and cell_2 45.

In Step 4 61, cell_3 47 has been fully discharged into Cells 1 and 2 and the process of fully charging cell_3 47 from cells 1, 2 and 4 (43, 45 and 49) begins.

In Step 5 63, Cell_3 47 has been fully charged from cells 1, 2 and 4 (43, 45 and 49) and cell 2 is discharged into cells 1 and 4 (43, 49).

Step 6 65, shows Cell_2 45 fully discharged into cells 1 and 4 43, 49 and the charging up of cell 2 45.

Step 7 67, shows Cell_2 fully charged by Cells 1, 3 and 4 and the discharge of cell 1 43.

Step 8 69, shows Cell_1 43 fully discharged into Cells 3 47 and 4 49 and the charging of cell_1 43.

In Step 9 71, Cell_1 has been fully charged by cells 2, 3 and 4 (45, 47 and 49) after which the charge is redistributed across all four cells to level out cell capacities as shown in step 10 73.

In this embodiment of the invention, the capacity of each cell is calculated from the subtraction of discharged and charged coulometric measurements. End of discharge and end charge cycles are defined by the cell manufacturer and for Lithium based cell chemistry are typically:

End of discharge cycle: Cell voltage falls below 3V with discharge current applied; and End of charge cycle: Cell charge current falls below 0.04 C and cell voltage is 4.2V+/−50 mV.

In addition, each cell has its own capacity register which is nulled at the end of cell discharge detection. The register value at the end of a full charge cycle from its initial nulled capacity state provides the absolute cell capacity measurement. The coulometric system increments the capacity register proportionate to current flow, incrementing from charge current and decrementing for discharge current.

The following calculations provide additional information concerning one example of automatic cell calibration in accordance with the present invention in a 4 cell battery.

$a$=initial relative cell capacity and $E$=dc/dc ACB efficiency

Effective battery pack capacity, $C_{eff}$, after each calibration step:—

$$C_{eff\,Step\_1}=4*a$$

$$C_{eff\,Step\_2}=[[a*E/3]a]*3$$

$$C_{eff\,Step\_3}=C_{eff\,Step\_2}-(1-E)$$

$$C_{eff\,Step\_4}C_{eff\,Step\_3}-(1-E)*(C_{eff\,Step\_3}-1)/3$$

$$C_{eff\,Step\_5}=C_{eff\,Step\_4}-(1-E)$$

$$C_{eff\,Step\_6}=C_{eff\,Step\_5}-(1-E)*(C_{eff\,Step\_5}-1)/3$$

$$C_{eff\,Step\_7}=C_{eff\,Step\_6}-(1-E)$$

$$C_{eff\,Step\_8}=C_{eff\,Step\_7}-(1-E)*(C_{eff\,Step\_7}-1)/3$$

$$C_{eff\,Step\_9}=C_{eff\,Step\_8}-(1-E)$$

$$C_{eff\,Step\_10}=4*((E/4)+(C_{eff\,Step\_9}-1)/3)$$

Maximum initial operational cell capacity:
$C_{max}=\{a*E/3+a\}<1$

Minimum initial operational cell capacity:
$C_{eff\,Step\_9}>1$

In the case of the example of the present invention in FIGS. 1 and 2, the maximum effective battery capacity at which the automatic capacity calibration can work is 78% any higher and there is not enough reserve capacity for a single cell to be completely discharged into.

In the case of the example of the present invention in FIGS. 1 and 2, the minimum effective battery capacity at which the automatic capacity calibration can work is 45% any less and there is too little energy to overcome the losses associated with the Active Cell Balancing system. Higher operating efficiency of the ACB system may lower the minimum effective battery capacity requirement, for example a 93% efficient ACB system would permit calibration from an initial 34% effective battery capacity.

The process as described above is controlled by a microcontroller unit which receives information on charge levels from data acquisition circuits and initiates the movement of charge between cells in accordance with a set of program instructions which define the order in which the cells are to be charged and discharged. Algorithms embedded into the battery management system MCU as firmware control the operation of the MCU.

In addition, it describes the implementation of a cell by cell calibration process. To speed up the calibration, and to minimise the energy lost by calibration, groups of multiple cells can be charged and discharged together. The group size and selection is determined from the initial state as defined by individual cell voltages.

A battery management system in accordance with the present invention may incorporate an Active Cell Balancing, ACB, system or any other means of transferring charge from one battery cell to another cell within the battery pack. The ACB system would typically comprise switch mode DC/DC converters using any combination of inductors, capacitors and transformers to transfer energy between cells. Typically each battery cell would have its own unique DC/DC converter controlled by the battery management system MCU. Such systems are described in WO 2006/082425

The system may also have a means for determining individual cell capacities preferably through a coulometric system on each battery cell.

The present invention provides an automated battery pack capacity self calibrating system and the use thereof to perform complete internal battery charge discharge cycles of individual cells or groups of cells.

The system can be initiated by battery user, manufacturer or as required by battery management system.

The system can be initiated during battery charge, discharge or idle operating states.

Advantageously, the system can disable a battery pack during its operation. Multiple cells can be simultaneously discharged and charged to reduce calibration time. Within each calibration group, cells will become fully discharged and charged at different times. To keep the regulators at maximum efficiency, these cells can progress to the next stage of the calibration cycle without waiting for the remaining cells to complete their cycle.

The use of switch mode converter topologies, regulators, based on inductor, capacitor and/or transformer energy storage and transfer devices to enable high energy inter cell battery management.

Improvements and modifications may be incorporated herein without deviating from the scope of the invention.

The invention claimed is:

1. A battery management system for measuring a state of charge in a battery having more than one sub-unit, the system comprising:
    a charge level detector for detecting charge levels in the sub-units;
    a charge distributor adapted to move charge between the sub-units;
    a controller adapted to receive charge level information and control the movement of charge in the battery;
    wherein, the controller initiates a discharge of a sub-unit to a predetermined level into the other sub-units and initiates the charging of said sub-unit in the battery to a predetermined level from the charge held on the other sub-units.

2. The battery management system as claimed in claim 1 wherein, the predetermined discharge level is a complete discharge of the sub-unit.

3. The battery management system as claimed in claim 1 wherein, the predetermined charge level is a full charge of the sub-unit.

4. The battery management system as claimed in claim 1 wherein, the charge level detector is a data acquisition circuit.

5. The battery management system as claimed in claim 1 wherein, each of the sub-units has a dedicated charge level detector.

6. The battery management system as claimed in claim 5 wherein, said dedicated charge level detector is located on the sub-unit.

7. The battery management system as claimed in claim 1 wherein, the charge level detector is adapted to report the capacity of a sub-unit to the controller.

8. The battery management system as claimed in claim 1 wherein, the controller is a battery management system Micro Controller Unit.

9. The battery management system as claimed in claim 1 wherein, the discharge of a sub-unit to a predetermined level into the other sub-units and the charging of said sub-unit in the battery to a predetermined level from the charge held on the other sub-units occur in sequence.

10. The battery management system as claimed in claim 1 wherein, the discharge and charge can occur simultaneously for different sub-units in a battery.

11. The battery management system as claimed in claim 1 wherein, the controller comprises program instructions which control the operation of the controller.

12. The battery management system as claimed in claim 11 wherein, the program instructions are adapted to optimise available initial capacity for sub-units.

13. The battery management system as claimed in claim 11 wherein, the program instructions determine if initial capacity conditions are suitable to allow battery calibration.

14. The battery management system as claimed in claim 1 wherein, the controller is provided with an estimated value of the initial state of charge of the battery pack and sub-units based upon individual sub-unit voltages.

15. The battery management system as claimed in claim 14 wherein, the controller determines the sub-unit group split for calibration process based on available initial estimated capacity.

16. The battery management system as claimed in claim 14 wherein, the sub-unit is one or more cell.

17. The battery management system as claimed in claim 1 wherein, the system further comprises a capacity register which is nulled at end of sub-unit discharge detection.

18. The battery management system as claimed in claim 17 wherein, each cell has a capacity register.

19. The battery management system as claimed in claim 18 wherein, the register value at the end of a full charge cycle from its initial nulled capacity state provides the absolute cell capacity measurement.

20. A method for measuring the state of charge in a battery having more than one sub-unit, the method comprising the steps of:
    detecting charge levels in the sub-units; and
    sending the charge level information to a controller which controls the movement of charge in the battery;
    wherein, the controller initiates the discharge of a sub-unit to a predetermined level into the other sub-units and the charging of said sub-unit in the battery to a predetermined level from the charge held on the other sub-units.

21. The method as claimed in claim 20 wherein, the predetermined discharge level is a complete discharge of the sub-unit.

22. The method as claimed in claim 20 wherein, the predetermined charge level is a full charge of the sub-unit.

23. The method as claimed in claim 20 wherein, the charge level is detected by a data acquisition circuit.

24. The method as claimed in claim 20 wherein, each of the sub-units has a dedicated charge level detector.

25. The method as claimed in claim 24 wherein, said dedicated charge level detector is located on the sub-unit.

26. The method as claimed in claim 20 wherein, the step of detecting the charge level comprises reporting the capacity of a sub-unit to the controller.

27. The method as clamed in claim 20 wherein, the controller is a battery management system Micro Controller Unit.

28. The method as claimed in claim 20 wherein, the discharge of a sub-unit to a predetermined level into the other sub-units and the charging of said sub-unit in the battery to a predetermined level from the charge held on the other sub-units occur in sequence.

29. The method as claimed in claim 20 wherein, the discharge and charge can occur simultaneously for different sub-units in a battery.

30. The method as claimed in claim 20 wherein, the controller comprises program instructions which control the operation of the controller.

31. The method as claimed in claim 30 wherein, the program instructions are adapted to optimise available initial capacity for sub-units.

32. The method as claimed in claim 30 wherein, the program instructions determine if initial capacity conditions are suitable to allow battery calibration.

33. The method as claimed in claim 20 wherein, the controller is provided with an estimated value of the initial state of charge of the battery pack and sub-units based upon individual sub-unit voltages.

34. The method as claimed in claim 20 wherein, the controller determines the sub-unit group split for calibration process based on available initial estimated capacity.

35. The method as claimed in claim 34 wherein, the sub-unit is one or more cell.

36. The method as claimed in claim 20 wherein, a capacity register value at the end of a full charge cycle from its initial nulled capacity state provides the absolute cell capacity measurement.

37. The battery management system as claimed in claim 15 wherein, the sub-unit is one or more cell.

* * * * *

UNITED STATES PATENT AND TRADEMARK OFFICE
CERTIFICATE OF CORRECTION

PATENT NO.        : 8,692,519 B2
APPLICATION NO.   : 13/001085
DATED             : April 8, 2014
INVENTOR(S)       : Mark Wayne Huggins It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 729 days.

Signed and Sealed this

Twenty-ninth Day of September, 2015

Michelle K. Lee
*Director of the United States Patent and Trademark Office*